(12) United States Patent
Huang et al.

(10) Patent No.: US 11,269,424 B2
(45) Date of Patent: Mar. 8, 2022

(54) ELECTRONIC DEVICE AND TRIGGER METHOD OF MACRO KEY USING EXTERNAL INPUT SIGNAL

(71) Applicant: GIGA-BYTE TECHNOLOGY CO., LTD., New Taipei (TW)

(72) Inventors: Hao-Kai Huang, New Taipei (TW); Cheng-Lung Lin, New Taipei (TW); Shih-Pin Chang, New Taipei (TW); Chih-Cheng Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/039,394

(22) Filed: Sep. 30, 2020

(65) Prior Publication Data
US 2021/0200326 A1    Jul. 1, 2021

(30) Foreign Application Priority Data
Dec. 31, 2019   (TW) .................................. 108148481

(51) Int. Cl.
*G06F 3/023*   (2006.01)
*A63F 13/22*   (2014.01)
(Continued)

(52) U.S. Cl.
CPC .............. *G06F 3/023* (2013.01); *A63F 13/22* (2014.09); *A63F 13/42* (2014.09); *G06F 3/017* (2013.01);
(Continued)

(58) Field of Classification Search
CPC ........ G06F 3/023; G06F 3/0238; G06F 3/017; G06F 3/14; G06F 3/16; G06F 13/4282;
(Continued)

(56) References Cited

U.S. PATENT DOCUMENTS 4,935,870 A     6/1990  Burk, Jr. et al.
10,281,893 B2*  5/2019  Xu ...................... G05B 19/0426
(Continued)

FOREIGN PATENT DOCUMENTS

JP    2014-157352 A    8/2014
JP    2015-533001 A    11/2015
(Continued)

OTHER PUBLICATIONS

Office Action issued in Taiwanese Patent Application No. 108148481 dated Sep. 18, 2020.
(Continued)

*Primary Examiner* — Tom V Sheng
(74) *Attorney, Agent, or Firm* — Birch, Stewart, Kolasch & Birch, LLP

(57) ABSTRACT

An electronic device is provided. The electronic device includes: a display apparatus and a host. The display apparatus includes a display controller and a display panel. The host executes an application to render a display image, and transmits the display image to the display controller through an image-transmission channel between the host and the display controller, and the display controller displays the display image on the display panel. The display controller determines whether an external input signal from a user satisfies a predetermined condition. In response to the external input signal satisfying the predetermined condition, the display controller triggers a virtual input signal corresponding to a specific macro key, and transmits the virtual input signal to the host through a data-transmission channel between the host and the display controller, so that the host executes a keystroke sequence corresponding to the specific macro key.

18 Claims, 6 Drawing Sheets

(51) Int. Cl.
  *A63F 13/42* (2014.01)
  *G06F 3/01* (2006.01)
  *G06F 3/14* (2006.01)
  *G06F 3/16* (2006.01)
  *G06F 13/42* (2006.01)
  *G06K 9/00* (2022.01)
  *G10L 15/22* (2006.01)
  *G06F 3/02* (2006.01)

(52) U.S. Cl.
  CPC ............... *G06F 3/14* (2013.01); *G06F 3/16* (2013.01); *G06F 13/4282* (2013.01); *G06K 9/00335* (2013.01); *G10L 15/22* (2013.01); *G06F 3/0219* (2013.01); *G06F 3/0238* (2013.01); *G06F 2213/0042* (2013.01)

(58) Field of Classification Search
  CPC .. G06F 2213/0042; A63F 13/22; A63F 13/42; A63F 13/215; A63F 13/422; A63F 13/424; A63F 13/213; A63F 13/52; A63F 13/55; A63F 13/822; A63F 2300/6045; A63F 2300/65; A63F 2300/807; G06K 9/00335; G10L 15/22
  USPC ........................................................ 345/168
  See application file for complete search history.

(56) References Cited

U.S. PATENT DOCUMENTS

| | | |
|---|---|---|
| 2007/0259716 A1 | 11/2007 | Mattice et al. |
| 2008/0088590 A1* | 4/2008 | Brown ................. G06F 3/0238 345/168 |
| 2009/0160779 A1 | 6/2009 | Crockett et al. |
| 2012/0191147 A1* | 7/2012 | Rao ........................ G16H 20/17 607/3 |
| 2014/0108990 A1* | 4/2014 | Zhai ...................... G06F 3/0237 715/773 |
| 2014/0267933 A1 | 9/2014 | Young |
| 2017/0052760 A1* | 2/2017 | Johnson ................ A63F 13/424 |
| 2019/0130618 A1* | 5/2019 | Todasco .................. G06F 3/023 |
| 2020/0167113 A1* | 5/2020 | Chen ..................... G06F 13/102 |

FOREIGN PATENT DOCUMENTS

| | | |
|---|---|---|
| TW | 456112 B | 9/2001 |
| TW | 200811682 A | 3/2008 |
| TW | 201227309 A1 | 7/2012 |

OTHER PUBLICATIONS

Extended European Search Report for European Application No. 20209295.3, dated May 19, 2021.

Japanese Office Action for Japanese Application No. 2020-217262, dated Nov. 30, 2021, with English translation.

\* cited by examiner

ELECTRONIC DEVICE AND TRIGGER METHOD OF MACRO KEY USING EXTERNAL INPUT SIGNAL

CROSS REFERENCE TO RELATED APPLICATIONS

This Application claims priority of Taiwan Patent Application No. 108148481, filed on Dec. 31, 2019, the entirety of which is incorporated by reference herein.

BACKGROUND OF THE INVENTION

Field of the Invention

The invention relates to electronic devices, and, in particular, to an electronic device and a trigger method of a macro key using an external input signal.

Description of the Related Art

Commercially available display apparatuses such as televisions and computer monitors currently have a variety of functions, and many of these functions are designed specifically for gamers, who require high frame rates, low response times, and so on. When a game player is playing a videogame, the game character often needs to press the corresponding hot key of a health-supplying function through the user's manual operation to supply health. However, when the situation in the game is urgent, the user often cannot manually press the corresponding hot key to manually replenish the health of the game character. In addition, it is easy to make a mistake and press the wrong hot key.

BRIEF SUMMARY OF THE INVENTION

In view of the above, an electronic device and a trigger method of a macro key using an external input signal are provided to solve the aforementioned problem.

In an exemplary embodiment, an electronic device is provided. The electronic device includes: a display apparatus and a host. The display apparatus includes a display controller and a display panel. The host is electrically connected to the display apparatus. The host executes an application to render a display image, and transmits the display image to the display controller through an image-transmission channel between the host and the display controller, and the display controller displays the display image on the display panel. The display controller determines whether an external input signal from a user satisfies a predetermined condition. In response to the external input signal satisfying the predetermined condition, the display controller triggers a virtual input signal corresponding to a specific macro key, and transmits the virtual input signal to the host through a data-transmission channel between the host and the display controller, so that the host executes a keystroke sequence corresponding to the specific macro key.

In some embodiments, the display apparatus further comprises an image-capturing unit, and the external input signal from the user is a plurality of images captured by the image-capturing unit, wherein the predetermined condition indicates that the captured user images comprise a specific gesture. In addition, the display apparatus further comprises a video-processing circuit that is configured to determine whether the images captured by the image-capturing unit comprise the specific gesture. In response to determining that the user images captured by the image-capturing unit comprise the specific gesture, the video-processing circuit issues a notification signal to the display controller, wherein the display controller generates the virtual input signal of the specific macro key corresponding to the specific gesture in response to the notification signal.

In some embodiments, the display apparatus further comprises a microphone, and the external input signal from the user is a sound signal captured by the microphone, wherein the predetermined condition indicates that the sound signal comprises a specific name corresponding to the specific macro key. In addition, the display apparatus further comprises an audio-processing circuit that is configured to determine whether the sound signal captured by the microphone comprises the specific name. In response to determining that the sound signal captured by the microphone comprises the specific name, the audio-processing circuit issues a notification signal to the display controller, and the display controller generates the virtual input signal of the specific macro key corresponding to the specific gesture in response to the notification signal.

In some embodiments, the display apparatus further comprises a keyboard controller and a hub. The keyboard controller is disposed outside the hub, and is configured to provide a manufacturer identifier and a product identifier for recognition by the host. The display controller generates a control signal corresponding to the specific name in response to the notification signal, and transmits the control signal to the keyboard controller. The keyboard controller generates the virtual input signal of the specific macro key corresponding to the specific name in response to the controller signal, and the virtual input signal is a keyboard scan-code sequence supporting the universal serial bus (USB) protocol.

In some other embodiments, the display apparatus further comprises a hub, and the hub comprises a microcontroller and a keyboard controller. The keyboard controller is configured to provide a manufacturer identifier and a product identifier for recognition by the host. The display controller generates a control signal corresponding to the specific name in response to the notification signal, and transmits the control signal to the microcontroller. The microcontroller generates the virtual input signal of the specific macro key corresponding to the specific name in response to the controller signal, and the virtual input signal is a keyboard scan-code sequence supporting the universal serial bus (USB) protocol.

In some other embodiments, the virtual input signal is a keyboard scan-code sequence supporting the USB protocol or a descriptor sequence comprising a plurality of descriptors. When the virtual input signal is the descriptor sequence, a driver executed by the host corresponding to the data-transmission channel analyzes the descriptor sequence to obtain the keystroke sequence of the specific macro key.

In yet another exemplary embodiment, a trigger method of a macro key using an external input signal for use in an electronic device is provided. The electronic device comprises a display apparatus and a host, and the display apparatus comprises a display panel and a display controller. The method includes the following steps: utilizing the host to execute an application to render a display image; utilizing the display controller to display the display image on the display panel; utilizing the display controller to detect whether an external input signal from a user satisfies a predetermined condition; and in response to the external input signal satisfying the predetermined condition, utilizing the display controller to trigger a virtual input signal corresponding to a specific macro key, and to transmit the virtual input signal to the host through a data-transmission channel between the host and the display controller, so that the host executes a keystroke sequence corresponding to the specific macro key.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1A:
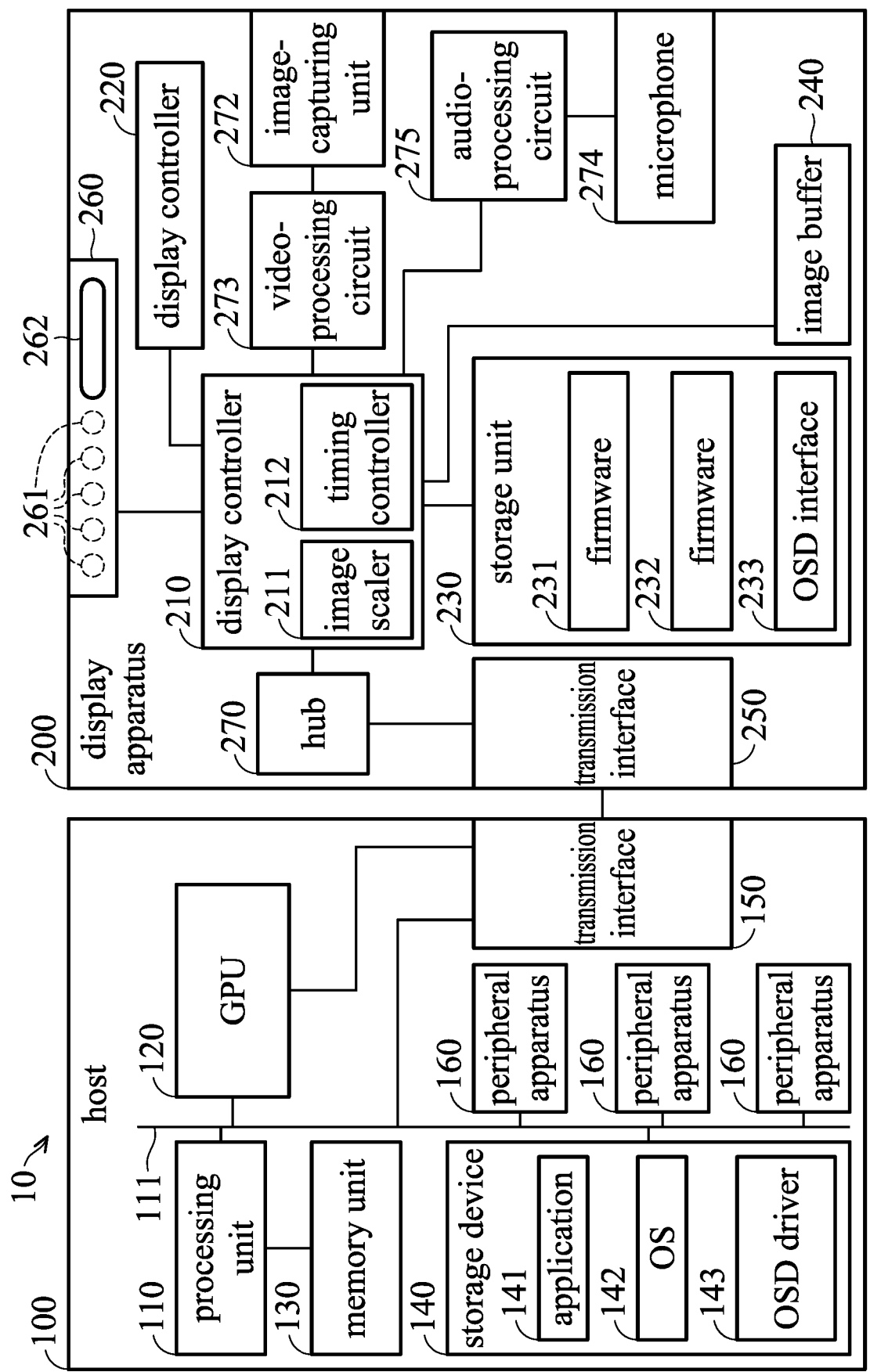
FIG. 1A is a block diagram of an electronic device in accordance with an embodiment of the invention.

FIG. 1A is a block diagram of an electronic device in accordance with an embodiment of the invention. The electronic device 10, for example, may be a personal computer or server equipped with a display apparatus. As illustrated in FIG. 1A, the electronic device 10 includes a host 100 and a display apparatus 200, wherein the host 100 has a signal connection to the display apparatus 200. For example, the host 100 may include a processing unit 110, a graphics processing unit (GPU) 120, a memory unit 130, a storage device 140, one or more transmission interfaces 150, and one or more peripheral apparatuses 160. The processing unit 110, graphics processing unit 120, memory unit 130, storage device 140, transmission interfaces 150, and peripheral apparatuses 160 may be coupled to each other via the system bus 111. The processing unit 110, for example, may be a central processing unit (CPU), a general-purpose processor, etc., but the invention is not limited thereto. The graphics processing unit 120, for example, may be a graphics processing unit on a video adapter or integrated into the processing unit 110.

The memory unit 130 may be a random access memory such as a static random access memory (SRAM) or a dynamic random access memory (DRAM), but the invention is not limited thereto. The storage device 140 may be a non-volatile memory such as a hard-disk drive, a solid-state disk (SSD), a flash memory, or a read-only memory (ROM), but the invention is not limited thereto.

The transmission interface 150 may include wired transmission interfaces and/or wireless transmission interfaces. The wired transmission interfaces may include: high definition multimedia interface (HDMI), DisplayPort (DP) interface, embedded DisplayPort (eDP) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto. The peripheral apparatus 160, for example, may include input apparatuses such as a keyboard, a mouse, a touch pad, etc., but the invention is not limited thereto.

For example, the storage device 140 may store one or more applications 141, an operating system 142 (e.g., Windows, Linux, MacOS, etc.), and a USB-driver program 143. The processing unit 110 may load the operating system 142, the USB-driver program 143, and one of the applications 141 to the memory unit 130 for execution. The USB-driver program 143 is configured to allow the host 100 to control the USB devices connected to the host 100 and to analyze the descriptor sequence from the display apparatus, where the details will be described later.

The graphics processing unit 120, for example, may perform graphics processing of the application executed by the processing unit 110 to generate an image signal including one or more images, and transmit the image signal to the display apparatus 200 via one of the transmission interfaces 150 (e.g., HDMI or DisplayPort interface).

The display apparatus 200, for example, may be a flat panel display, a television, a projector, or a computer monitor, but the invention is not limited thereto. The display apparatus 200 includes a display controller 210, a display module 220, a storage unit 230, an image buffer 240, one or more transmission interface 250, an input interface 260, and a hub 270. The transmission interface 250 may include wired transmission interfaces and/or wireless transmission interfaces. The wired transmission interfaces may include: high definition multimedia interface (HDMI), DisplayPort (DP) interface, embedded DisplayPort (eDP) interface, low-voltage differential signaling (LVDS) interface, Universal Serial Bus (USB) interface, USB Type-C interface, Thunderbolt interface, digital video interface (DVI), video graphics array (VGA) interface, general purpose input/output (GPIO) interface, universal asynchronous receiver/transmitter (UART) interface, serial peripheral interface (SPI), inter-integrated circuit (I2C) interface, or a combination thereof. The wireless transmission interfaces may include Bluetooth, WiFi, near-field communication (NFC) interface, etc., but the invention is not limited thereto.

The display controller 210, for example, may be implemented by an application-specific integrated circuit (ASIC), a system-on-chip (SoC), a processor, or a microcontroller, but the invention is not limited thereto.

The display module 220, for example, may be a liquid-crystal display panel, a light-emitting diode (LED) display panel, an organic light-emitting diode (OLED) display panel, a cathode ray tube (CRT) display, an E-Ink display module, an electroluminescent display module, a plasma display module, a projection display module, or a quantum dot display module, but the invention is not limited thereto.

The storage unit 230, for example, may be a non-volatile memory such as a read-only memory (ROM), an erasable programmable read-only memory (EPROM), an electrically erasable programmable read-only memory (EEPROM), etc., but the invention is not limited thereto. The storage unit 230 is configured to store firmware 231 associated with the display apparatus 200. The storage unit 230 may be disposed outside the display controller 210, or alternatively integrated into the display controller 210.

The firmware 231, for example, may include extended display identification data (EDID) and display settings of the display apparatus 200, and one or more on-screen-display (OSD) interfaces 233. The EDID, for example, may include information such as the manufacturer, product name, resolution, frames per second (FPS) of the display apparatus 200. The display settings of the display apparatus 200 may include the brightness, contrast, sharpness, color temperature of the display apparatus 200. The firmware 232 is used to control the OSD interfaces 233 of the display apparatus 200.

In an embodiment, the display controller 210 may read the firmware 231 and 232 and program code of the OSD interface 233 stored in the storage unit 230 via a bus (e.g., an I2C bus), and configure the corresponding display parameters. In addition, the display controller 210 may transmit the EDID of the display apparatus 200 to the host 100 via one of the transmission interfaces 250 (e.g., may be an image-transmission channel or a data-transmission channel), so that the processing unit 110 and the graphics processing unit 120 in the host 100 may configure the resolution and corresponding synchronization signals of the output image signal based on the EDID. The OSD interfaces 233, for example, may include an OSD menu and corresponding options, an information dashboard, a timer, a counter, a crosshair, a specific symbol, a specific color, a specific text, or a combination thereof, but the invention is not limited thereto.

The image buffer 240, for example, may be a volatile memory (e.g., a DRAM) or a non-volatile memory (e.g., a flash memory), that is configured to store output images to be displayed on the display module 220, wherein the host 100 or the display controller 210 may, according to an OSD control signal generated by the host 100, overwrite a specific region of the image signal stored in the image buffer 240 with the one or more OSD interfaces 233 to generate an output image.

The input interface 260 is configured to control the OSD menu of the display apparatus 200. The input interface 260 may be one or more physical buttons 261 or a five-way joystick 262 to implement instructions such as up, down, left, right, and confirm. The hub 270, for example, may be a USB hub, and one of the transmission interfaces 250 may be a USB interface. The host 100 may transmit data to the display controller via the USB interface of the transmission interfaces 150 and 250 through the hub 270, and the display controller 210 may also transmit data to the host 100 via the USB interface of the transmission interfaces 150 and 250 through the hub 270.

In an embodiment, when the user performs an operation in one direction on a five-way joystick 262 (or presses one of the physical buttons 261), the display controller 210 may read the firmware 232 and the program code or firmware of the OSD menu and corresponding options of the OSD interfaces 233 from the storage unit 230, and display the OSD menu and corresponding options on the display module 220. In an embodiment, the user may perform operations on the input interface 260 to control the OSD menu of the display apparatus to adjust the brightness, contrast, sharpness, color temperature, or activate or deactivate other interfaces among the OSD interfaces 233. For example, the firmware 231 can be regarded as the default firmware of the display apparatus 200, and the user may control the settings of the OSD interface 233 displayed on the display apparatus 200 via the five-way joystick 262 (or the physical buttons 261).

In an embodiment, the display controller 210 may include an image scalar 211 and a timing controller 212. The display controller 210 may receive the image signal from the host 100 and/or another signal from other hosts via one of the transmission interfaces 250, and the image scalar 211 may perform an image-scaling process and/or image-overlaying process on the received image signals to fit the resolution of the display module 220, and store the images (e.g., output images) generated by the image-scaling process to the image buffer 240. The timing controller 212 may control the display module 220 to read the output images from the image buffer 240 for display.

In another embodiment, the display controller 210 may include the timing controller 212, and the resolution of the image signal from the host 100 may fit that of the display module 220. Thus, the display controller 210 may directly store the received image signal from the host 100 to the image buffer 240 without performing the image-scaling process. The timing controller 212 may read the output images stored in the image buffer 240, and control the display module 220 to display the output images.

In some embodiments, the display apparatus 200 may include functions of gesture recognition and/or speech recognition that are configured to allow the display controller 210 to trigger a hotkey control signal, and each of display apparatuses 200 with different configurations may generate a keystroke sequence corresponding to a respective macro key using different methods, and transmit the keystroke sequence to the host 100 through the data-transmission channel, so that the host 100 executes the input operation corresponding to the macro key. For example, the keystroke sequence may be a keyboard scan-code sequence of various keyboard scan codes, or a descriptor sequence of various descriptors.

For example, the display apparatus 200 may include an image-capturing unit 272 and a video-processing circuit 273, and/or a microphone 274 and an audio-processing circuit 275, wherein the image-capturing unit and the video-processing circuit 273 are required for the gesture function, and the microphone 274 and the audio-processing circuit 275 are required for speech recognition.

The image-capturing unit 272, for example, may be implemented by a charge-coupled device (CCD) sensor or a complementary metal-oxide semiconductor (CMOS) sensor, but the invention is not limited thereto. The image-capturing unit 272 may be disposed in a specific location (e.g., the middle position of the upper edge or lower edge) of the housing of the display apparatus 200, and the shooting range of the image-capturing unit 272 is aimed at the user, thereby capturing user images including gestures performed by the user. The video-processing circuit 273, for example, may be implemented by an application-specific integrated circuit (ASIC), a digital-signal processor (DSP), or a field-programmable gate array (FPGA), but the invention is not limited thereto.

The video-processing circuit 273 is configured to recognize any specific gesture performed by the user from the user image. The display apparatus 200 may include a gesture database (not shown in FIG. 1A) that stores images of one or more specific gestures. In response to the video-processing circuit 273 determining that one of the gestures in the gesture database has occurred in the user image, the video-processing circuit 273 transmits a notification signal to the display controller 210 to inform the display controller 210 that the user has performed a specific gesture. After the display controller 210 has received the notification signal, the display controller 210 generates a keyboard scan-code sequence of a macro key corresponding to the specific gesture, and transmits the keyboard scan-code sequence to the host 100 through the hub 270 and transmission interfaces 250 and 150, so that the processing unit 110 can execute the keyboard scan-code sequence to perform a specific operation. In addition, the keyboard scan-code sequence, for example, may be one or more keyboard scan codes that support the Universal Serial Bus (USB) protocol. When the host 100 has been equipped with a physical USB keyboard, the host 100 will regard the keyboard scan codes of the physical USB keyboard and the keyboard scan codes from the display apparatus 200 as being from different USB devices, such as from the physical USB keyboard and the emulated keyboard of the display apparatus 200, so they will not conflict with each other.

For example, the host 100 may execute a computer game (e.g., a fighting game: Street Fighter), and the main character of the game, for example, needs to cast a specific move (e.g., "hadouken") that requires complicated operations, such as continuously pressing bottom, bottom right, right, and punch buttons within a predetermined time. At this time, the user only needs to use his hand or head to perform gestures corresponding to the specific attack, and when the video-processing circuit 273 determines that the specific gestures corresponding to the specific move has occurred in the user image captured by the image-capturing unit 272, the video-processing circuit 273 may issue a notification signal to the display controller 210 to inform the display controller that the user has performed the specific gesture corresponding to the specific move. Thus, the display controller 210 will generate the keyboard scan-code sequence of the macro key corresponding to the specific gesture and transmit the keyboard scan-code sequence to the host 100, so that the host 100 can enter the macro key corresponding to the specific move in the computer game to allow the main character to cast the specific move or use an item in the game. It should be noted that the gesture in this case may include, but not limited to, hands or heads, or postures of the limbs.

The microphone 274, for example, may be a directional microphone for aligning a user's direction to capture the sound signal emitted by the user. The audio-processing circuit 275 may be implemented by an application-specific integrated circuit (ASIC), a digital signal processor (DSP), or a field-programmable gate array (FPGA), but the invention is not limited thereto. The audio-processing circuit 275 is configured to perform speech recognition on the sound signal of the user, thereby determining whether the sound signal emitted by the user include the name of a certain specific attack that is predefined in a speech database (not shown in FIG. 1A). In response to the audio-processing circuit 275 determining that the sound signal emitted by the user includes the name of a certain specific attack, the audio-processing circuit 275 may issue a notification signal to the display controller 210 to inform the display controller 210 that the user has emitted the sound signal including the name of the specific move. After the display controller 210 has received the notification signal, the display controller 210 may generate a keyboard scan-code sequence of a macro key corresponding to the name of the specific move, and transmit the keyboard scan-code sequence to the host 100 through the hub 270 and transmission interfaces 250 and 150, so that the processing unit 110 executes the keyboard scan-code sequence to perform the specific operation such as allowing the game character to cast a specific move or use an item in the game. Accordingly, the user can make a speech to cast a corresponding specific move without manually pressing a button, so it is easier to win in the game, thereby increasing the user experience.

In some cases, the computer game or game platform executed by the host 100 may include a detection program to detect and prevent instructions issued by improper programs from interfering with the fairness of the game. The electronic device in the invention can perform gesture recognition and speech recognition through the display apparatus 200, and can send the corresponding keyboard scan-code sequence or descriptor sequence to the host 100, so that the host 100 can perform corresponding operations, which can avoid being detected as an improper program by the detection program.

It should be noted that the invention is not limited to being applied only to computer games, and can also be applied to other programs. In general, the amount of calculation required to perform speech recognition or gesture recognition is quite large. If the display controller 210 is implemented by a general microcontroller, the video-processing circuit 273 and audio-processing circuit 275 are respectively required for the display controller 210 to perform gesture recognition and speech recognition. If the display controller 210 is implemented by a powerful CPU, gesture recognition and/or speech recognition can be completely processed by the display controller 210, which means that the video processing circuit 273 and/or audio-processing circuit 275 can be omitted in FIG. 1A in this case.

In some embodiments, the host 100 and display apparatus 200, for example, may support the technique of "dynamic device mapping". When the display controller 210 has received the notification signal from the video-processing circuit 273 or the audio-processing circuit 275, the display controller 210 can generate the descriptor sequence corresponding to a macro key of the specific move, wherein each descriptor represents the point of time that a respective button is pressed or released. Accordingly, in the embodiment, the display controller 210 does not need to generate a keyboard scan-code sequence corresponding to the key macro, and can directly transmit the aforementioned descriptor sequence to the host 100 through the hub 270 and transmission interfaces 250 and 150. Therefore, the USB driver 143 executed by the host 100 can analyze the descriptor sequence to obtain the keystroke sequence, and execute the obtained keystroke sequence to allow the game character to cast a specific move or use an item in the game.

Figure 1B:
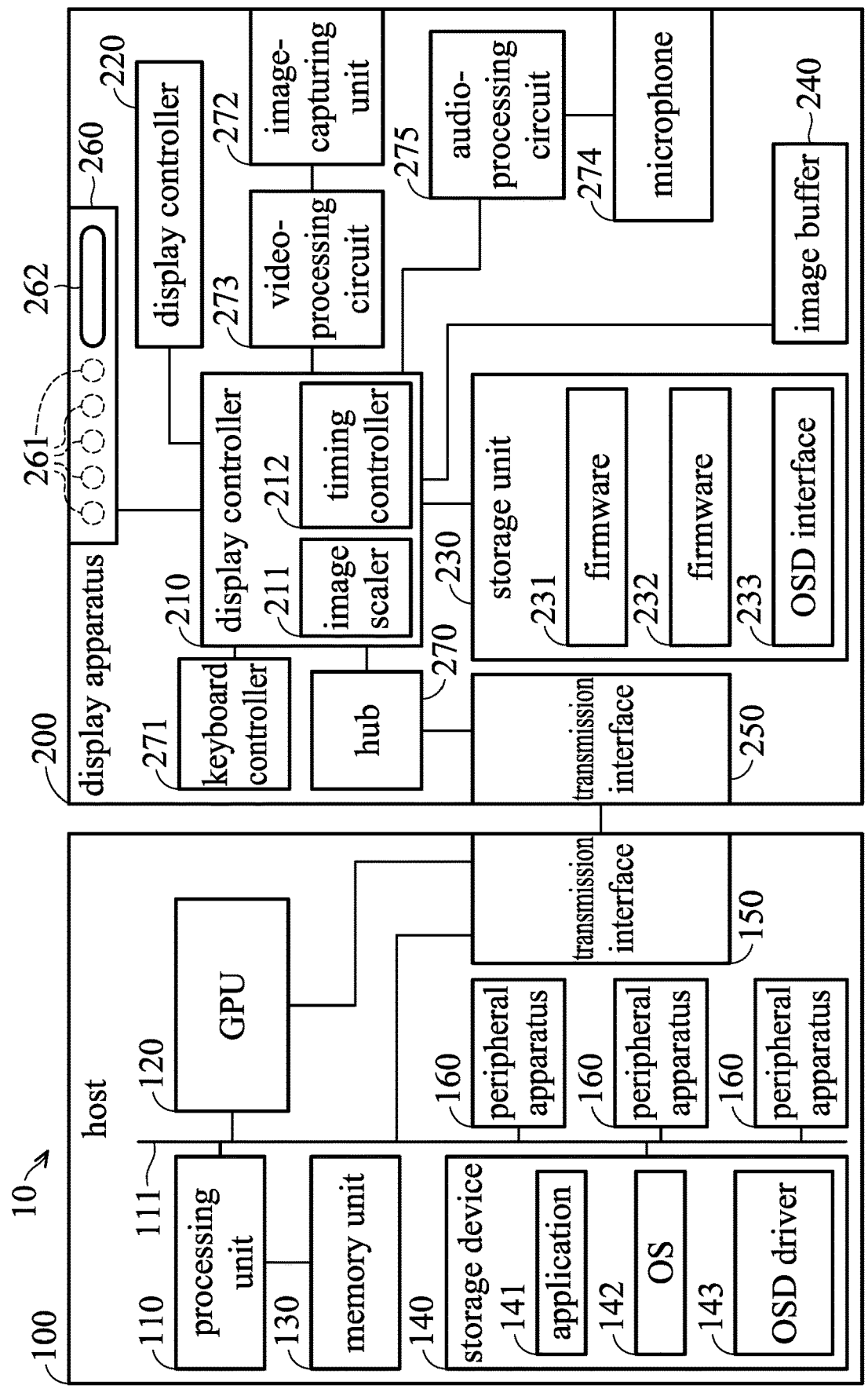
FIG. 1B is a block diagram of an electronic device in accordance with another embodiment of the invention.

FIG. 1B is a block diagram of an electronic device in accordance with another embodiment of the invention.

FIG. 1B is similar to FIG. 1A, and the different between FIG. 1B and FIG. 1A is that the display apparatus 200 in FIG. 1B further includes a keyboard controller 271 that is electrically connected to the display controller 210 and the hub 270. The keyboard controller 271 can be implemented by, for example, an embedded microcontroller or a keyboard IC that is configured to provide a physical manufacturer ID and product ID for recognition by the host 100.

In the embodiment, when the display controller 210 has received the notification signal from the video-processing circuit 275 or the audio-processing circuit 273, the display controller 210 can generate a control signal (e.g., a number indicating a macro key) corresponding to a specific move to notify the keyboard controller 271, and the keyboard controller 271 will generate the keyboard scan-code sequence corresponding to the macro key of the specific move, wherein the keyboard scan-code sequence may include one or more keyboard scan codes that support the USB protocol. Thus, the keyboard controller 271 may transmit the keyboard scan codes corresponding to the macro key of the specific move to the host 100 through the hub 270 and transmission interfaces 250 and 150, so that the processing unit 110 executes the keyboard scan codes to perform the specific operation such as allowing the game character to cast a specific move or use an item in the game.

Figure 1C:
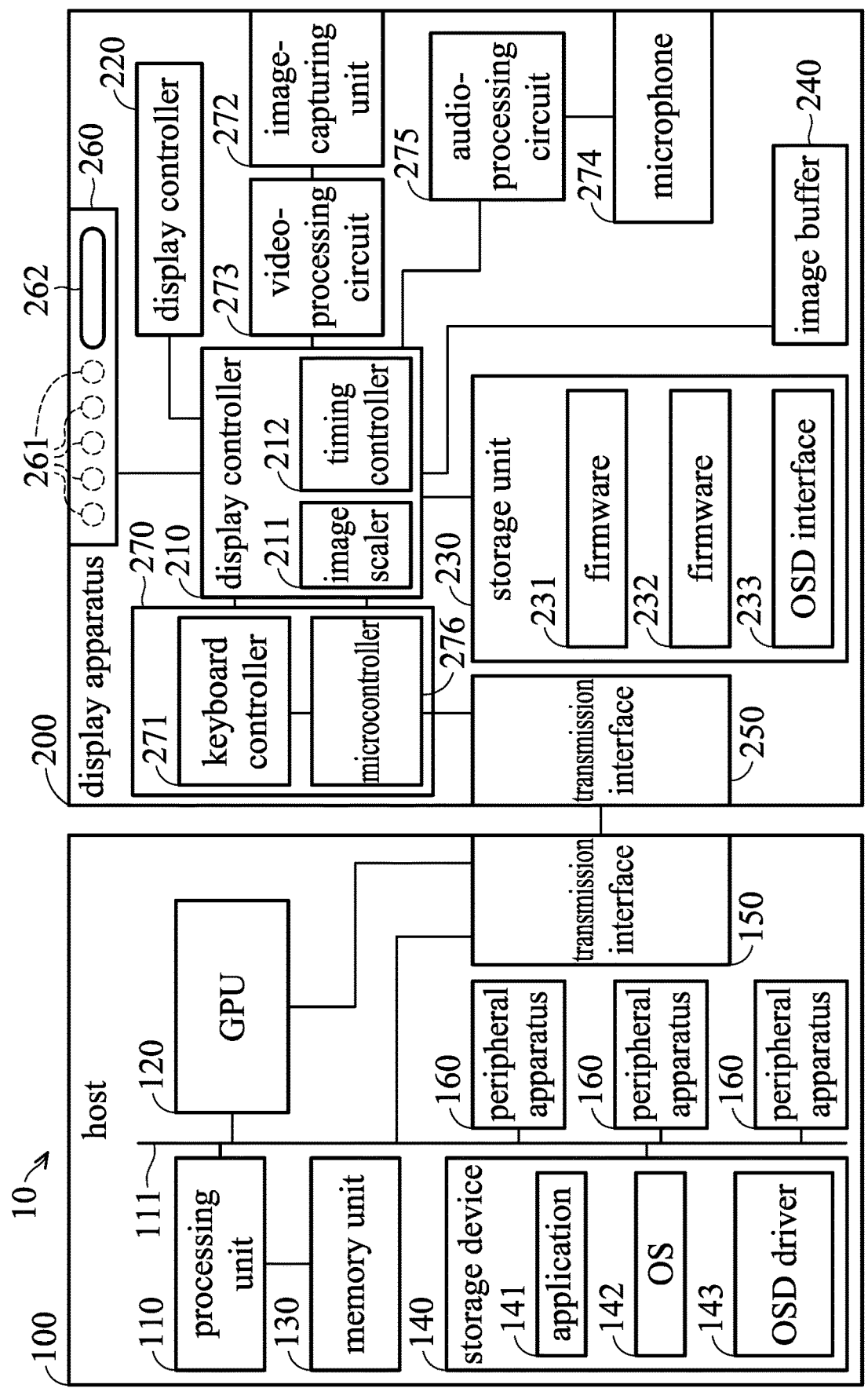
FIG. 1C is a block diagram of an electronic device in accordance with yet another embodiment of the invention.

FIG. 1C is a block diagram of an electronic device in accordance with yet another embodiment of the invention.

FIG. 1C is similar to FIG. 1A, and the difference between FIG. 1C and FIG. 1A is that the hub 270 in the display apparatus 200 in FIG. 1C further includes a keyboard controller 271 and a microcontroller 276. The keyboard controller 271 can be implemented by, for example, an embedded microcontroller or a keyboard IC, and is used to provide a physical manufacturer ID and product ID for recognition by the host 100. In some embodiments, the microcontroller 276 and keyboard controller 271 in the hub 270 are different physical components. In some other embodiments, the functions of the keyboard controller 271 can be integrated into the microcontroller 276, and the firmware executed by the microcontroller 276 can include the functions of the keyboard controller 271.

After the display controller 210 has received the notification signal from the video-processing circuit 273 or the audio-processing circuit 275, the display controller 210 may generate a control signal (e.g., a number indicating a macro key) of a specific move, and transmit the control signal to the hub 270. The microcontroller 276 of the hub 270 can recognize the control signal, and control the keyboard controller 271 to process the control signal. For example, the keyboard controller 271 may generate a keyboard scan-code sequence corresponding to the macro key of the specific move in response to the control signal, wherein the keyboard scan-code sequence may include one or more keyboard scan codes that support the USB protocol.

Figure 2A:
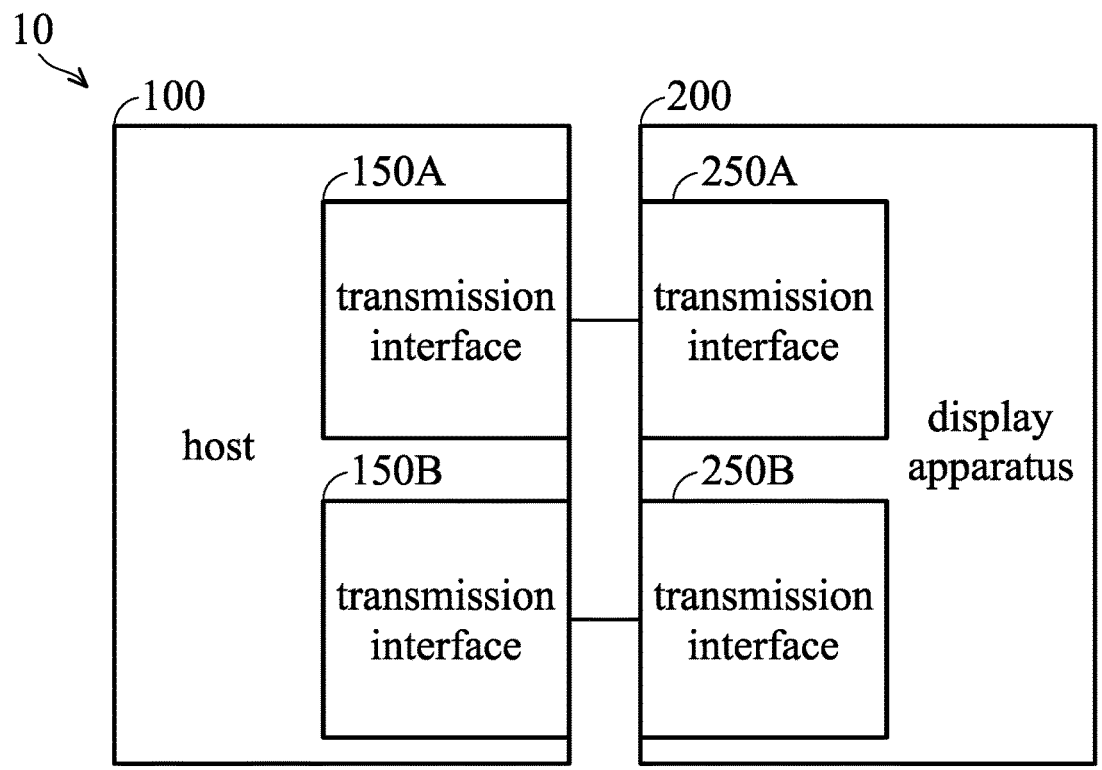
FIGS. 2A and 2B are diagrams of connection between the host and display apparatus in the electronic device in accordance with an embodiment of the invention.
Figure 2B:
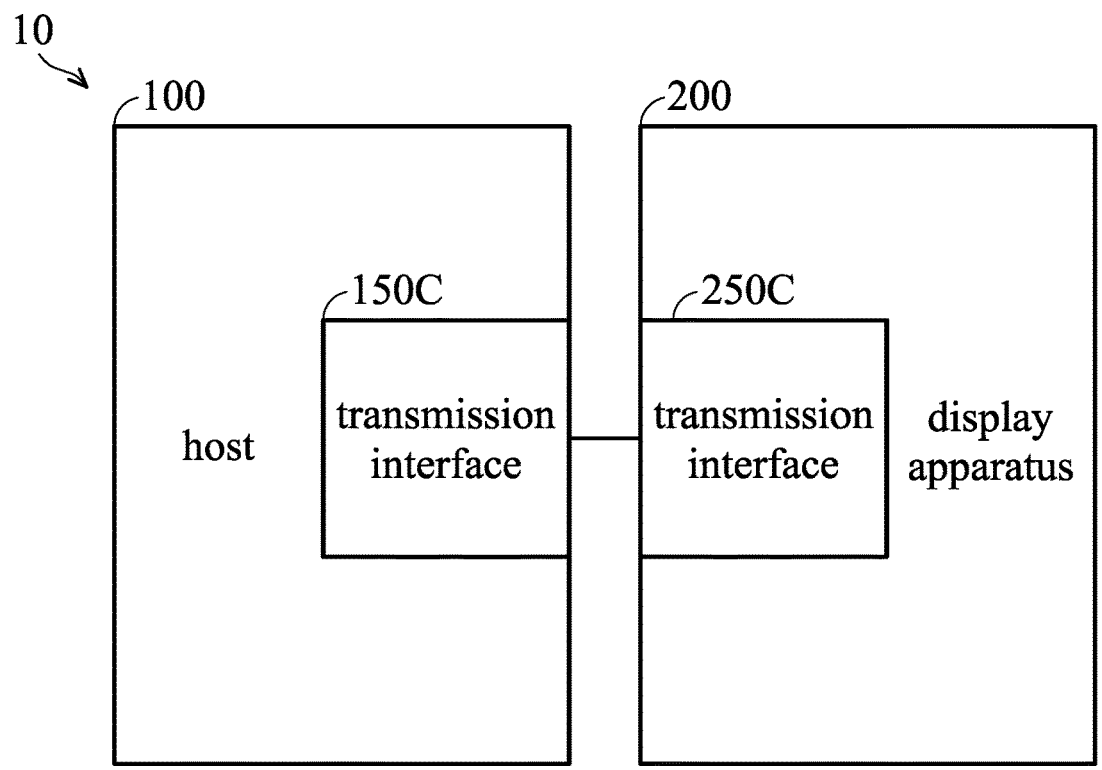

FIGS. 2A and 2B are diagrams of connection between the host and display apparatus in the electronic device in accordance with an embodiment of the invention.

In an embodiment, as depicted in FIG. 2A, the image signal generated by the graphics processing unit 120 of the host 100 may be transmitted to the display controller 210 of the display apparatus 200 via the transmission interface 150A (e.g., an HDMI interface) of the host 100 and the transmission interface 250A (e.g., an HDMI interface) of the display apparatus 200. For example, the transmission channel between the transmission interfaces 150A and 250A can be regarded as an image-transmission channel. The transmission channel between the transmission interfaces 150B and 250B can be regarded as a data-transmission channel or a control-signal-transmission channel. In FIGS. 1A to 1C, the display controller 210, keyboard controller 271, or hub 270 may transmit the keyboard scan-code sequence or descriptor sequence to the host 100 through the data-transmission channel between the host 100 and the display apparatus 200. In some embodiments, if the electronic device 10 is a laptop computer, the transmission interfaces 150A and 250A can be eDP interfaces or LVDS interfaces, and the transmission interfaces 150B and 250B may be internal bus interfaces, I2C interfaces, or SPI interfaces, but the invention is not limited thereto.

In some other embodiments, as depicted in FIG. 2B, the image signal generated by the graphics processing unit 120 of the host 100 can be transmitted to the display controller 210 of the display apparatus 200 via the transmission interface 150C (e.g., a USB Type-C interface) of the host 100 and the corresponding transmission interface 250C (e.g., a USB Type-C interface) of the display apparatus 200.

It should be noted that the USB Type-C protocol may support Hi-Speed and SuperSpeed data transmission in addition to the image/video transmission (e.g., supporting the DisplayPort or HDMI standards). That is, the image-transmission channel and the data-transmission channel can be integrated into the USB Type-C interface. Accordingly, the host 100 may transmit the OSD control signal to the display apparatus 200 via the transmission interface 150C (e.g., a USB Type-C interface) of the host 100 and the corresponding transmission interface 250C (e.g., a USB Type-C interface) of the display apparatus 200.

It should also be noted that, depending on the hardware configuration of the display apparatus 200 (e.g., whether a physical keyboard controller is equipped) and the computation capability of the display controller 210, one of the electronic devices in FIGS. 1A to 1C can be used, and the connection methods of FIGS. 2A and 2B are applicable.

Figure 3:
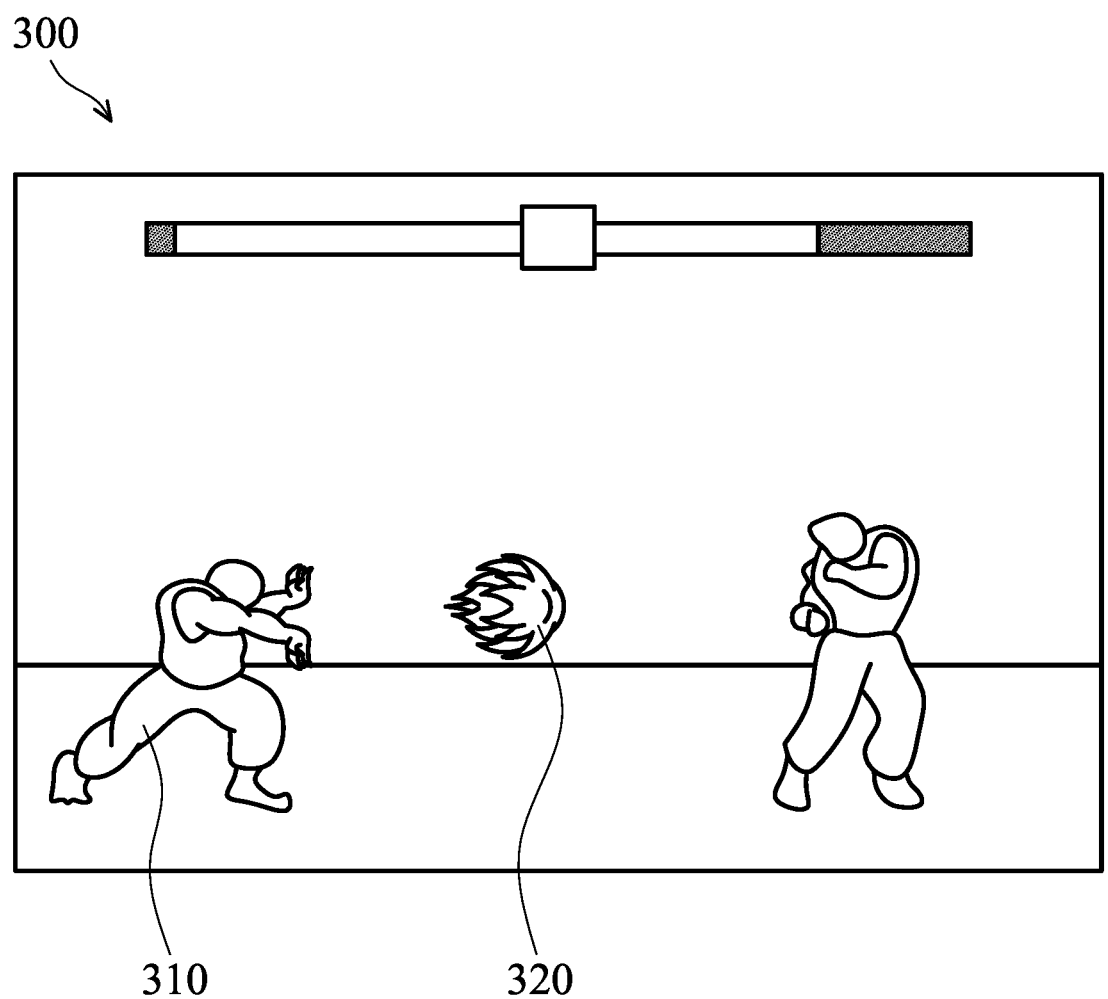
FIG. 3 is a diagram of a user interface of a computer game in accordance with an embodiment of the invention.

FIG. 3 is a diagram of a game interface of a computer game in accordance with an embodiment of the invention.

In an embodiment, for example, the host 100 may execute a specific computer game (e.g., Street Fighter), and the game interface 300 of the specific computer game is shown in FIG. 3. The user may use the gesture function or the speech recognition function of the display apparatus to allow the game character to cast a specific move or use an item in the game. For example, the user may perform a specific gesture corresponding to a specific move (e.g., "hadoken" 320). When the display apparatus 200 captures user images and recognize the specific gesture from the captured user images, the display apparatus 200 may generate a keyboard scan-code sequence or descriptor sequence corresponding to a macro key of the specific move using one of the methods in the embodiments of FIGS. 1A to 1C. The display apparatus 200 may transmit the keyboard scan-code sequence or descriptor sequence to the host 100, so that the host 100 can analyze the keyboard scan-code sequence or descriptor sequence to obtain the keystroke sequence, and execute the keystroke sequence to allow the game character 310 to cast the specific move 320 or use an item in the game.

In addition, the user can also issue a voice command for a specific move to the display apparatus 200. When the display apparatus 200 captures the user's voice signal and recognizes the name of the specific move, the display apparatus 200 may generate a keyboard scan-code sequence or descriptor sequence corresponding to a macro key of the specific move using one of the methods in the embodiments of FIGS. 1A to 1C. The display apparatus 200 may transmit the keyboard scan-code sequence or descriptor sequence to the host 100, so that the host 100 can analyze the keyboard scan-code sequence or descriptor sequence to obtain the keystroke sequence, and execute the keystroke sequence to allow the game character 310 to cast the specific move 320 or use an item in the game.

Figure 4:
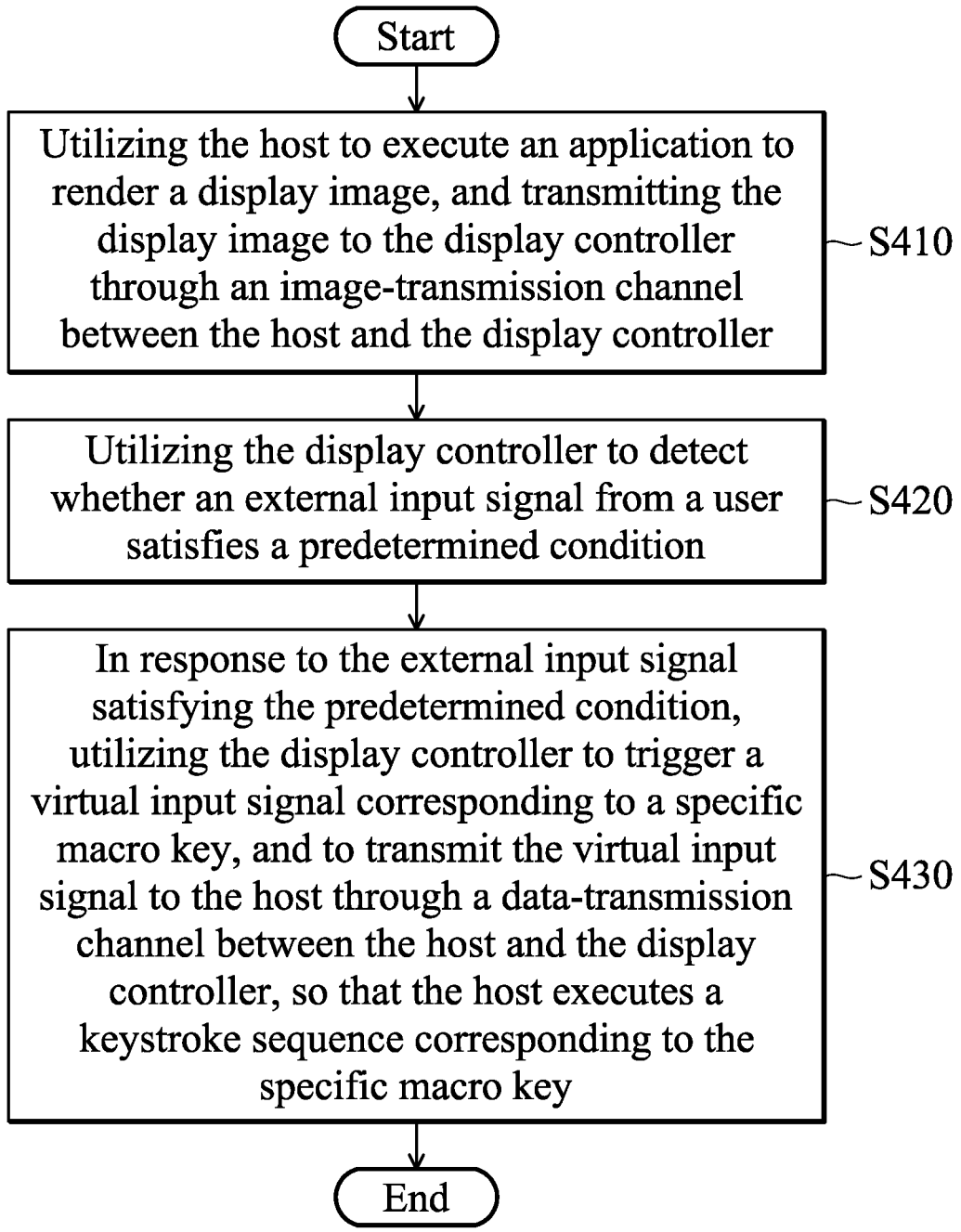
FIG. 4 is a flow chart of a trigger method of a macro key using an external input signal in accordance with an embodiment of the invention.

FIG. 4 is a flow chart of a trigger method of a macro key using an external input signal in accordance with an embodiment of the invention.

In step S410, the host 100 executes an application to render a display image, and transmits the display image to the display controller 210 via an image-transmission channel between the host 100 and the display controller 210. For example, the host 100 can transmit the image signal of the display image to the display apparatus 200 through the image-transmission channel, and when the display apparatus 200 determines to trigger a virtual input signal (e.g., keyboard scan-code sequence or descriptor sequence), the display apparatus 200 will transmit the virtual input to the host 100 through the data-transmission channel, wherein the connections of the data-transmission channel and the image-transmission channel can be referred to the embodiments of FIGS. 2A and 2B.

In step S420, the display controller 210 determines whether an external input signal from a user satisfies a predetermined condition. For example, the display apparatus 200 may include functions of gesture recognition and/or speech recognition that are configured to allow the display controller 210 to trigger a hotkey control signal, and each of display apparatuses 200 with different configurations may generate a keystroke sequence corresponding to a respective macro key using different methods, and transmit the keystroke sequence to the host 100 through the data-transmission channel, so that the host 100 executes the input operation corresponding to the macro key. For example, the keystroke sequence may be a keyboard scan-code sequence of various keyboard scan codes, or a descriptor sequence of various descriptors. In addition, the external input signal may be the gesture performed by the user or a sound signal emitted by the user.

In step S430, in response to the external input signal satisfying the predetermined condition, the display controller 210 generates a virtual input signal corresponding to a specific macro key, and transmits the virtual input signal to the host 100 through the data-transmission channel between the host 100 and the display controller 210, so that the host 100 executes a keystroke sequence corresponding to the specific macro key in the application. For example, the virtual input signal may be a keyboard scan code sequence supporting the USB protocol or a descriptor sequence including a plurality of descriptors. When the virtual input signal is the descriptor sequence, the USB driver 143 executed by the host 100 may analyze the descriptor sequence to obtain the keystroke sequence corresponding to the specific macro key.

In view of the above, an electronic device and a trigger method of a macro key using an external input signal are provided. The electronic device and the method are capable of determining whether an external input signal from a user satisfies a predetermined condition. In response to the external input signal satisfying the predetermined condition, the display apparatus generates a virtual input signal corresponding to a specific macro key. The display controller may transmit the virtual input signal to the host through the data-transmission channel between the host and the display apparatus, so that the host can execute the keystroke sequence corresponding to the specific macro key. Accordingly, the function a specific macro key can be automatically triggered by a specific gesture performed by the user or a specific sound signal emitted by the user, so that the host can immediately execute the keystroke sequence of the specific macro key in the game to cast a corresponding move, thereby avoiding the situation that the user cannot manually press the corresponding hot key to replenish health or it is easy to press the wrong hot key to cause mistakes while playing the game, thereby increasing the user experience.

The use of terms such as "first", "second", and "third" in claims is used to modify elements in the claims, and is not used to indicate that there is a priority order, antecedent relationship, or is an element preceded by another element, or a chronological order when performing a method step, only used to distinguish elements with the same name.

While the invention has been described by way of example and in terms of the preferred embodiments, it should be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An electronic device, comprising:
   a display apparatus, comprising a display controller and a display panel; and
   a host, electrically connected to the display apparatus;
   wherein the host executes an application to render a display image, and transmits the display image to the display controller through an image-transmission channel between the host and the display controller, and the display controller displays the display image on the display panel,
   wherein the display controller determines whether an external input signal from a user satisfies a predetermined condition,
   wherein in response to the external input signal satisfying the predetermined condition, the display controller triggers a virtual input signal corresponding to a specific macro key, and transmits the virtual input signal to the host through a data-transmission channel between the host and the display controller, so that the host executes a keystroke sequence corresponding to the specific macro key.

2. The electronic device as claimed in claim 1, wherein the display apparatus further comprises an image-capturing unit, and the external input signal from the user is a plurality of images captured by the image-capturing unit,
   wherein the predetermined condition indicates that the captured user images comprise a specific gesture.

3. The electronic device as claimed in claim 2, wherein the display apparatus further comprises a video-processing circuit that is configured to determine whether the images captured by the image-capturing unit comprise the specific gesture,
   wherein in response to determining that the user images captured by the image-capturing unit comprise the specific gesture, the video-processing circuit issues a notification signal to the display controller,
   wherein the display controller generates the virtual input signal of the specific macro key corresponding to the specific gesture in response to the notification signal.

4. The electronic device as claimed in claim 1, wherein the display apparatus further comprises a microphone, and the external input signal from the user is a sound signal captured by the microphone,
   wherein the predetermined condition indicates that the sound signal comprises a specific name corresponding to the specific macro key.

5. The electronic device as claimed in claim 4, wherein the display apparatus further comprises an audio-processing circuit that is configured to determine whether the sound signal captured by the microphone comprises the specific name,
   wherein in response to determining that the sound signal captured by the microphone comprises the specific name, the audio-processing circuit issues a notification signal to the display controller, and the display controller generates the virtual input signal of the specific macro key corresponding to the specific gesture in response to the notification signal.

6. The electronic device as claimed in claim 5, wherein the display apparatus further comprises a keyboard controller and a hub, and the keyboard controller is disposed outside the hub, and is configured to provide a manufacturer identifier and a product identifier for recognition by the host,
  wherein the display controller generates a control signal corresponding to the specific name in response to the notification signal, and transmits the control signal to the keyboard controller,
  wherein the keyboard controller generates the virtual input signal of the specific macro key corresponding to the specific name in response to the controller signal, and the virtual input signal is a keyboard scan-code sequence supporting the universal serial bus (USB) protocol.

7. The electronic device as claimed in claim 5, wherein the display apparatus further comprises a hub, and the hub comprises a microcontroller and a keyboard controller, and the keyboard controller is configured to provide a manufacturer identifier and a product identifier for recognition by the host,
  wherein the display controller generates a control signal corresponding to the specific name in response to the notification signal, and transmits the control signal to the microcontroller,
  wherein the microcontroller generates the virtual input signal of the specific macro key corresponding to the specific name in response to the controller signal, and the virtual input signal is a keyboard scan-code sequence supporting the universal serial bus (USB) protocol.

8. The electronic device as claimed in claim 1, wherein the virtual input signal is a keyboard scan-code sequence supporting the USB protocol or a descriptor sequence comprising a plurality of descriptors.

9. The electronic device as claimed in claim 8, wherein when the virtual input signal is the descriptor sequence, a driver executed by the host corresponding to the data-transmission channel analyzes the descriptor sequence to obtain the keystroke sequence of the specific macro key.

10. A trigger method of a macro key using an external input signal, for use in an electronic device, wherein the electronic device comprises a display apparatus and a host, and the display apparatus comprises a display panel and a display controller, the method comprising:
  utilizing the host to execute an application to render a display image, transmitting the display image to the display controller through an image-transmission channel between the host and the display controller, and utilizing the display controller to display the display image on the display panel;
  utilizing the display controller to detect whether an external input signal from a user satisfies a predetermined condition; and
  in response to the external input signal satisfying the predetermined condition, utilizing the display controller to trigger a virtual input signal corresponding to a specific macro key, and to transmit the virtual input signal to the host through a data-transmission channel between the host and the display controller, so that the host executes a keystroke sequence corresponding to the specific macro key.

11. The method as claimed in claim 10, wherein the display apparatus further comprises an image-capturing unit, and the external input signal from the user is a plurality of images captured by the image-capturing unit,
  wherein the predetermined condition indicates that the captured user images comprise a specific gesture.

12. The method as claimed in claim 11, wherein the display apparatus further comprises a video-processing circuit that is configured to determine whether the images captured by the image-capturing unit comprise the specific gesture, and the method further comprises:
  in response to determining that the user images captured by the image-capturing unit comprise the specific gesture, utilizing the video-processing circuit to issue a notification signal to the display controller; and
  utilizing the display controller to generate the virtual input signal of the specific macro key corresponding to the specific gesture in response to the notification signal.

13. The method as claimed in claim 10, wherein the display apparatus further comprises a microphone, and the external input signal from the user is a sound signal captured by the microphone,
  wherein the predetermined condition indicates that the sound signal comprises a specific name corresponding to the specific macro key.

14. The method as claimed in claim 13, wherein the display apparatus further comprises an audio-processing circuit that is configured to determine whether the sound signal captured by the microphone comprises the specific name, and the method further comprises:
  in response to determining that the sound signal captured by the microphone comprises the specific name, utilizing the audio-processing circuit to issue a notification signal to the display controller; and
  utilizing the display controller to generate the virtual input signal of the specific macro key corresponding to the specific gesture in response to the notification signal.

15. The method as claimed in claim 14, wherein the display apparatus further comprises a keyboard controller and a hub, and the keyboard controller is disposed outside the hub, and is configured to provide a manufacturer identifier and a product identifier for recognition by the host, and the method further comprises:
  utilizing the display controller to generate a control signal corresponding to the specific name in response to the notification signal, and to transmit the control signal to the keyboard controller; and
  utilizing the keyboard controller to generate the virtual input signal of the specific macro key corresponding to the specific name in response to the controller signal, wherein the virtual input signal is a keyboard scan-code sequence supporting the universal serial bus (USB) protocol.

16. The method as claimed in claim 13, wherein the display apparatus further comprises a hub, and the hub comprises a microcontroller and a keyboard controller, and the keyboard controller is configured to provide a manufacturer identifier and a product identifier for recognition by the host, and the method further comprises:
  utilizing the display controller to generate a control signal corresponding to the specific name in response to the notification signal, and to transmit the control signal to the microcontroller; and
  utilizing the microcontroller to generate the virtual input signal of the specific macro key corresponding to the specific name in response to the controller signal, wherein the virtual input signal is a keyboard scan-code sequence supporting the universal serial bus (USB) protocol.

17. The method as claimed in claim 10, wherein the virtual input signal is a keyboard scan-code sequence supporting the USB protocol or a descriptor sequence comprising a plurality of descriptors.

18. The method as claimed in claim 17, further comprising:

when the virtual input signal is the descriptor sequence, utilizing a driver executed by the host corresponding to the data-transmission channel to analyze the descriptor sequence to obtain the keystroke sequence of the specific macro key.

* * * * *